United States Patent
Therene et al.

(10) Patent No.: US 11,080,337 B2
(45) Date of Patent: Aug. 3, 2021

(54) STORAGE EDGE CONTROLLER WITH A METADATA COMPUTATIONAL ENGINE

(71) Applicant: Marvell International Ltd., Hamilton (BM)

(72) Inventors: Christophe Therene, Livermore, CA (US); Nedeljko Varnica, San Jose, CA (US); Konstantin Kudryavtsev, Sunnyvale, CA (US); Manish Shrivastava, Pleasanton, CA (US); Mats Oberg, San Jose, CA (US); Noam Mizrahi, Modi'in (IL); Leo Jiang, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/264,473

(22) Filed: Jan. 31, 2019

(65) Prior Publication Data
US 2020/0042240 A1 Feb. 6, 2020

Related U.S. Application Data (60) Provisional application No. 62/712,823, filed on Jul. 31, 2018, provisional application No. 62/714,563, (Continued)

(51) Int. Cl.
| | |
|---|---|
| *G06F 16/907* | (2019.01) |
| *G06F 16/901* | (2019.01) |
| *G06F 16/9038* | (2019.01) |
| *G06F 16/9035* | (2019.01) |
| *G06F 16/783* | (2019.01) |
| *G06F 16/387* | (2019.01) |
| *G06F 16/683* | (2019.01) |

(Continued)

(52) U.S. Cl.
CPC .......... *G06F 16/907* (2019.01); *G06F 3/0604* (2013.01); *G06F 3/068* (2013.01); *G06F 3/0638* (2013.01); *G06F 3/0659* (2013.01); *G06F 3/0688* (2013.01); *G06F 12/1054* (2013.01); *G06F 15/17331* (2013.01); *G06F 16/383* (2019.01); *G06F 16/387* (2019.01); *G06F 16/683* (2019.01); *G06F 16/783* (2019.01); *G06F 16/901* (2019.01); *G06F 16/9035* (2019.01); *G06F 16/9038* (2019.01); *G06N 3/08* (2013.01); *H04L 49/901* (2013.01); *H04L 67/1097* (2013.01); *G06F 2212/254* (2013.01)

(58) Field of Classification Search
CPC ...... G06F 16/907; G06F 3/0659; G06F 3/068; G06F 12/1054; G06F 15/17331; G06F 16/783; G06F 16/387; G06F 16/683; G06F 16/383; G06F 3/0604; G06F 3/0638; G06F 3/0688; G06F 16/901; G06F 16/9038; G06F 16/9035; G06F 2212/254; G06F 16/41; H04L 49/901; H04L 67/1097; G06N 3/08
See application file for complete search history.

(56) References Cited

U.S. PATENT DOCUMENTS

| | | |
|---|---|---|
| 6,012,068 A | 1/2000 | Boezeman |
| 6,215,749 B1 | 4/2001 | Kim |
| (Continued) | | |

*Primary Examiner* — Tasnima Matin (57) ABSTRACT

Embodiments described herein provide improved methods and systems for generating metadata for media objects at a computational engine (such as an artificial intelligence engine) within the storage edge controller, and for storing and using such metadata, in data processing systems.

20 Claims, 7 Drawing Sheets

Related U.S. Application Data filed on Aug. 3, 2018, provisional application No. 62/716,269, filed on Aug. 8, 2018, provisional application No. 62/726,847, filed on Sep. 4, 2018, provisional application No. 62/726,852, filed on Sep. 4, 2018.

(51) Int. Cl.

| | | |
|---|---|---|
| *G06F 16/383* | (2019.01) | |
| *G06F 3/06* | (2006.01) | |
| *G06N 3/08* | (2006.01) | |
| *G06F 12/1045* | (2016.01) | |
| *G06F 15/173* | (2006.01) | |
| *H04L 12/879* | (2013.01) | |
| *H04L 29/08* | (2006.01) | |

(56) References Cited

U.S. PATENT DOCUMENTS

| | | |
|---|---|---|
| 8,938,492 B1 | 1/2015 | Kelly |
| 9,451,329 B2 | 9/2016 | Whitman et al. |
| 9,639,969 B1 | 5/2017 | Wilson |
| 9,966,112 B1 | 5/2018 | Kulkarni et al. |
| 10,129,109 B2 | 11/2018 | Jayanti Venkata et al. |
| 2004/0143590 A1 | 7/2004 | Wong |
| 2005/0055406 A1 | 3/2005 | Singhai et al. |
| 2006/0047706 A1 | 3/2006 | Castro et al. |
| 2007/0038647 A1 | 2/2007 | Thomas |
| 2007/0156726 A1 | 7/2007 | Levy |
| 2008/0195664 A1 | 8/2008 | Maharajh et al. |
| 2009/0132462 A1 | 5/2009 | Szabo |
| 2009/0216719 A1 | 8/2009 | Coffman et al. |
| 2011/0235858 A1 | 9/2011 | Hanson et al. |
| 2012/0265735 A1 | 10/2012 | McMillan et al. |
| 2012/0278560 A1 | 11/2012 | Benzion et al. |
| 2012/0278705 A1 | 11/2012 | Yang et al. |
| 2013/0289991 A1 | 10/2013 | Eshwar et al. |
| 2013/0297652 A1 | 11/2013 | Higgins et al. |
| 2014/0074855 A1 | 3/2014 | Zhao et al. |
| 2014/0122427 A1 | 5/2014 | Dary |
| 2014/0250256 A1 | 9/2014 | Duran |
| 2014/0270407 A1 | 9/2014 | Balakrishnan et al. |
| 2015/0156263 A1 | 6/2015 | Clayton et al. |
| 2016/0036882 A1 | 2/2016 | Jin et al. |
| 2016/0170871 A1* | 6/2016 | Hyun .................. G06F 3/0679 711/103 |
| 2016/0191591 A1 | 6/2016 | Rider |
| 2016/0335339 A1 | 11/2016 | Venkataraman et al. |
| 2016/0378402 A1 | 12/2016 | Amidi et al. |
| 2017/0094341 A1 | 3/2017 | Berner et al. |
| 2017/0169358 A1* | 6/2017 | Choi .................. G06F 16/9535 |
| 2017/0185869 A1 | 6/2017 | Dua et al. |
| 2017/0193362 A1 | 7/2017 | Cremer et al. |
| 2017/0199886 A1 | 7/2017 | Perrine |
| 2017/0293431 A1 | 10/2017 | Dor et al. |
| 2017/0304732 A1 | 10/2017 | Velic et al. |
| 2017/0331893 A1 | 11/2017 | Crofton et al. |
| 2018/0024770 A1 | 1/2018 | Lee |
| 2018/0033208 A1 | 2/2018 | Martin |
| 2018/0189615 A1 | 7/2018 | Kang et al. |
| 2018/0307609 A1 | 10/2018 | Qiang et al. |
| 2019/0138617 A1 | 5/2019 | Farre Guiu et al. |
| 2020/0042888 A1* | 2/2020 | Yu .................. G11C 11/161 |

* cited by examiner

STORAGE EDGE CONTROLLER WITH A METADATA COMPUTATIONAL ENGINE

CROSS-REFERENCE TO RELATED APPLICATION

This disclosure claims the benefit under 35 U.S.C. § 119(e) of copending, commonly-assigned United States Provisional Patent Applications Nos. 62/712,823, filed Jul. 31, 2018; 62/714,563, filed Aug. 3, 2018; 62/716,269, filed Aug. 8, 2018; 62/726,847, filed Sep. 4, 2018; and 62/726,852, filed Sep. 4, 2018. Each of the following commonly-assigned United States nonprovisional patent applications also claims the benefit of the aforementioned United States provisional patent applications, and is being filed concurrently herewith:

1. United States Patent Application No. 16/264,248;
2. United States Patent Application No. 16/263,387;
3. United States Patent Application No. 16/262,975; and
4. United States Patent Application No. 16/262,971.

Each of the aforementioned provisional and nonprovisional patent applications is hereby incorporated by reference herein in its respective entirety.

FIELD OF USE

This disclosure relates to storage control and management of a non-volatile storage device, and specifically, to a storage controller with a computational engine.

BACKGROUND OF THE DISCLOSURES

Existing storage systems often store data with associated metadata that provides a description or a meaning of the data in a compact format. Common formats of the metadata include various labels, tags, data type indicators, objects and activities detected in the data, location where the data was created, and the like. Metadata is often generated by a host system, such as a data center, interacting with a storage system such as a data storage center where the data is stored. For example, the storage system is configured to obtain stored data from a non-volatile memory and send the obtained data to the host system over a computer network. The host system can then analyze the obtained data and generate metadata relating to the obtained data. The generated metadata is then passed back to the storage system for storage via the host interface. The volume of data exchanged between the storage system and the host system can thus be significant, thus negatively impacting available bandwidth of computer processing and networking systems. As a result, it is practically impossible to generate metadata for substantial volumes of media that are generated in today's world.

SUMMARY

Embodiments described herein provide a storage device controller for managing storage and retrieval of data at one or more storage devices. The storage device controller includes a host interface configured to communicate with one or more hosts, a memory interface configured to communicate locally with a non-volatile memory of the one or more storage devices, a first processor configured to manage local storage or retrieval of objects at the non-volatile memory. The storage device controller further includes a computational engine configured to obtain, from a volatile memory, a first computational model and a set of parameters for implementing the first computational model, and selectively compute, using the first computational model, metadata that defines content characteristics of the objects that are retrieved from the non-volatile memory or that are received from the one or more hosts for storage in the non-volatile memory.

In some implementations, the volatile memory is a dynamic random-access memory coupled to the storage device controller.

In some implementations, the volatile memory is a host memory buffer allocated by a host system to the storage device controller, and the host memory buffer is accessible by the storage device controller over a computer network connection, or a bus connection (e.g., PCIe).

In some implementations, the computational engine comprises a second processor that is separate from the first processor and is configured to perform computational tasks relating to metadata generation including implementing the first computational model. The first processor is configured to send a computational task relating to metadata generation to the second processor at the computational engine without taking up resource of the first processor for an ongoing operation being performed by the storage device controller.

In some implementations, the computational engine further includes a volatile memory coupled to the second processor. The volatile memory is a static random-access memory configured to cache at least a portion of the objects during computation of the metadata that defines content characteristics of the cached portion of objects.

In some implementations, the first processor is further configured to receive, via the host interface, the objects from the one or more hosts. The objects are to be stored at the non-volatile memory. The first processor is further configured to temporarily store the received objects at a volatile memory disposed within the storage device controller for metadata computation. After computation of the metadata that defines content characteristics of the objects is completed, the first processor is configured to send, via the memory interface, the received objects from the volatile memory to the non-volatile memory for storage. The first processor is configured to perform at least one of: sending, via the host interface, the metadata to the host system, and sending, via the memory interface, the metadata to the non-volatile memory for storage.

In some implementations, the first processor is further configured to receive, via the host interface, a command from a host system of the one or more hosts to retrieve the objects from the non-volatile memory. In response to the command, the first processor is configured to retrieve, via the memory interface, the objects from the volatile memory disposed within the storage controller for metadata computation. After computation of metadata defining content characteristics of the objects is completed, the first processor is configured to send, via the memory interface, the metadata and the objects to the non-volatile memory for storage.

In some implementations, the first processor is further configured to receive, via the host interface and from the one or more hosts, a request for metadata while the computational engine is computing the metadata. The first processor is further configured to respond to the request for metadata asynchronously by waiting until the requested metadata is computed at the computational engine; and sending, via the host interface, the requested metadata to the host system while new metadata, different from the requested metadata, is being computed at the computational engine.

In some implementations, the first processor is further configured to in response to the command, determine whether the command from the host system requires an update of the first computational model. In response to determining that the command from the host system does not require an update of the computational model, the first processor is configured to instruct the computational engine to implement an existing computational model. In response to determining that the command from the host system requires the first computational model to be updated to a second computational model different from the first computational model, the first processor is configured to retrieve a set of updated parameters for the second computational model from the volatile memory disposed within the storage controller, or, via the host interface, from a host buffer memory disposed within the host system. The first processor is further configured to send the set of updated parameters to the computational engine to implement the second computational model.

In some implementations, the computational engine is further configured to automatically generate metadata that defines content characteristics of the objects by performing any of identification of persons of interest or other objects; customized insertion of advertisements into streamed videos; cloud-based analytics of data from autonomous vehicles; analytics of call and response quality in a ChatBot Voice calls database, text documents and text messages database analysis; mood detection; scene identification within a video file or voice call; identification of persons or objects in surveillance footage; identification of types of actions occurring in surveillance footage; identification of voices or types of sounds in recordings; classification of phrases and responses used during conversations; and analysis of automotive sensor data and driving response.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

Embodiments described herein provide improved methods and systems for generating metadata for media objects at a computational engine (such as an artificial intelligence engine) within the storage edge controller, and for storing and using such metadata, in data processing systems.

In some embodiments, a data processing system is used for storing and analyzing a large volume of media objects. Some non-limiting examples of media objects include videos, sound recordings, still images, textual objects such as text messages and e-mails, data obtained from various types of sensors such as automotive sensors and Internet-of-Things (IoT) sensors, database objects, and/or any other suitable objects. Some non-limiting examples of object analysis applications include identification of persons of interest or other objects in video footage of security cameras, customized insertion of advertisements ("ads") into streamed videos, cloud-based analytics of data from autonomous vehicles, and many others, analytics of call and response quality in a ChatBot Voice calls database, text documents and/or text messages database analysis, mood detection, scene identification within a video file or Voice call, identification of persons or objects in surveillance footage, identification of types of actions occurring in surveillance footage, identification of voices or types of sounds in recordings, classification of phrases and/or responses used during conversation, analysis of automotive sensor data and driving responses, and many others.

As discussed in the Background of this disclosure, traditionally, a host system is configured to read media objects from a non-volatile memory, generate metadata relating to the media objects, and then pass the metadata back to the non-volatile memory for storage. The volume of data exchanged between the non-volatile memory and the host system can thus be significant, and thus negatively impacting available bandwidth of computer processing and networking systems.

In view of inefficiencies of metadata computation at host systems that are remotely located from where data is stored, which systems necessitate the transfer large quantities of data over computer networks from data storage to data compute locations, as described in the background, the computation of metadata at the storage edge is described. By computing metadata at the storage edge the transmission of excessive data over computer networks is obviated. Specifically, embodiments described herein provide a computational engine that is located within a storage controller of a non-volatile storage device to generate metadata on data en-route to storage in a non-volatile storage device or that is retrieved from a non-volatile storage device. In this way, the storage device is able to generate metadata locally, e.g., via an internal computational engine residing within the storage controller, without passing the original data content to the host system for processing. By computing metadata using advanced computational engines that are local with respect to where data is stored, metadata generation is no longer limited, for instance, by the capacity of the host interface of the storage device, or by bandwidth limitations of computer networks over which data is transferred from storage to compute facilities. By computing metadata for stored data, in particularly for unstructured or partially structured media, at the storage edge, the efficiency of data storage and generation of metadata describing stored data is improved.

As used herein, the term "storage edge" is used to mean a module or a component that is local to a non-volatile storage device. For example, a controller that controls the operation of one or more storage devices to store or retrieve data at one or more instances of a non-volatile memory is disposed on storage edge. The storage edge is found for example in dedicated storage devices, or at storage networks, and is separated from a processor that is remotely located, for instance in a host computer or at a data center. Communication between the storage edge and a remote is host is over a computer network connection.

As used herein, the term "data objects," "media objects" or "objects" are used to mean various types of data that is issued by an application running on a host system and can be stored on a storage device. Examples of "media objects" or "objects" can include, but not limited to videos, sound recordings, still images, textual objects such as text messages and e-mails, data obtained from various types of sensors such as automotive sensors and Internet-of-Things (IoT) sensors, database objects, and/or any other suitable objects. In many cases, the media objects are unstructured. As used herein, the term "unstructured object" means that the media content of the object (e.g., textual content, audio content, image content or video content) is provided is raw form and is not organized in advance according to a fixed field format. An unstructured object is not tagged a-priori with metadata that defines any aspects of the content per frame or other content portion. Unstructured data is non-transactional, and its format does not readily conform to a relational database schema.

As used herein, the term "metadata" is used to refer to a high-level representation of the actual data content of media objects stored in a non-volatile storage device. The "metadata" can be an abstraction layer of the actual data content, which gives a description or a meaning of data content in a compact format. Metadata can be generated from media objects, which are almost always unstructured, in various ways. Example metadata can include labels, tags, types of data, objects/concepts/sentiments detected in data content, spatial/temporal locations of such objects/concepts/sentiments within the data content, etc.

As used herein, the term "in-storage compute" is used to refer that data stored on a storage device (e.g., hard disk drive, solid-state drive, etc.) that is processed locally by a storage controller on that storage device to automatically generate structure for the data. In other words, data is not sent to a separate server or a host system, for instance over a computer network, but rather is processed within the "boundaries" of the storage device. While "in-storage compute" can refer to different kinds of computation, such computations can be carried out, in one implementation, by an artificial intelligence (AI) engine within the storage device.

As used herein, the term "artificial intelligence (AI) model" is used to refer to any suitable AI algorithm, e.g., implemented on a deep neural network or any recurrent neural network or any variation of those. In some implementations, an AI model is suitably any other Supervised learning or Unsupervised Learning or Reinforcement learning algorithms. An AI model is trained using a "training set"—a body of media objects and corresponding metadata that is known to be accurate. The trained AI model is then applied to generate metadata for other media objects. A software or hardware module that receives a pre-trained AI model and uses it to compute metadata of objects is referred to herein as an "AI engine" or "AI interface engine." In some implementations, several different AI models will be applied to unstructured or partially structured media objects.

Figure 1:
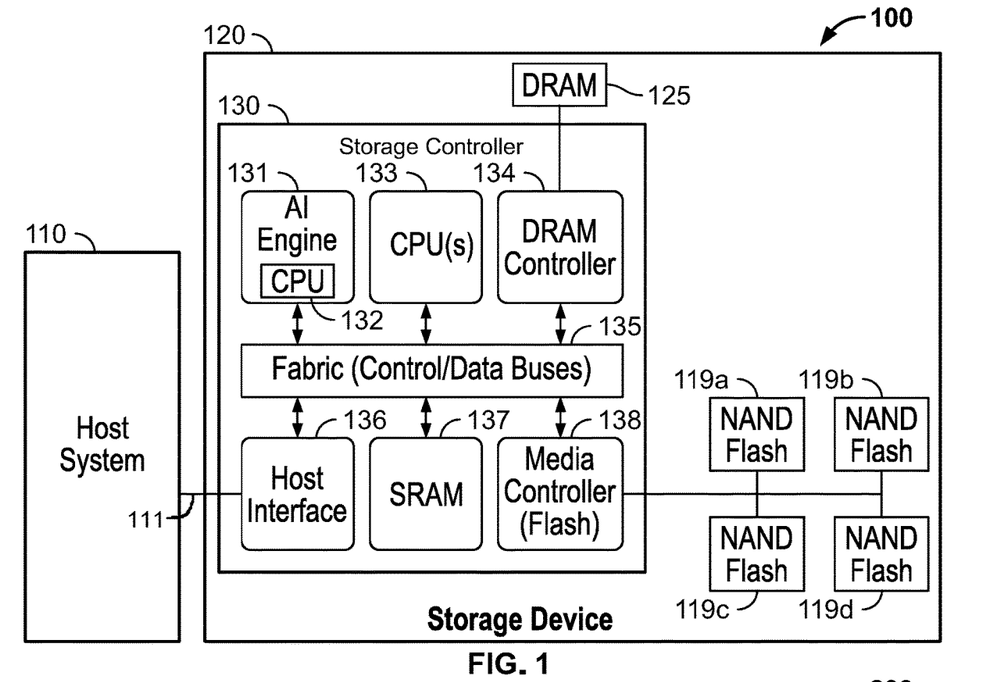
FIG. 1 is a block diagram illustrating an in-storage device compute structure with an in-storage DRAM for a solid-state device (SSD) storage device, according to one embodiment described herein.

FIG. 1 is a block diagram 100 illustrating an in-storage device compute structure with an in-storage DRAM for a storage device, according to one embodiment described herein. The storage device includes any kind of non-volatile memories, such as but not limited to a solid-state device (SSD), a hybrid hard drive, etc. Diagram 100 shows a storage device 120 connected to a host system 110. The host system 110 is remotely located respective of the storage device 120, which is accessible via a computer network.

The storage device 120, for example an SSD storage device controller, includes a plurality of non-volatile memories, depicted as NAND flash memories 119*a-d* (but other types of non-volatile memories are also applicable) in FIG. 1, connected to a storage controller 130 via a data bus.

In an implementation, storage controller 130 is configured as a system on chip comprising one or more integrated circuits that are combined together in a package. The storage controller 130 is configured to perform a read or write operation at non-volatile memories (e.g., the NAND flash memories 119*a-d*), e.g., to read stored data content from the NAND flash memories 119*a-d*, or to write data content to the NAND flash memories 119*a-d* for storage.

The storage controller 130 includes various modules such as the host interface 136, the central processing unit (CPU) 133 of the storage controller, local memories (SRAM 137 or DRAM 125 via DRAM controller 134), the media controller 138, etc. The various modules are configured to interact with each other via the fabric of the control or data buses 135. Specifically, the CPU 133 is configured to issue instructions for the storage controller 130 to perform various tasks such as a write or read operation at one or more of the NAND memories 119*a-n*. The SRAM 137 is configured to cache data generated or used during an operation performed by the storage controller 130. The media controller 138 is configured to interface communication with the NAND flash memories 119*a-d*, in an implementation. The host interface 136 is configured to interface communication with an external host system 110, for instance over a computer network connection 111.

In accordance with an implementation, the storage controller 130 further includes a computational engine such, as for example an AI engine 131, which communicates, via the fabric of control or data buses 135, with other modules inside the storage controller 130. The AI engine 131 is configured as an accelerator to process data content, separately from CPU 133, to generate metadata that describes the data content that is stored in and retrieved from one of the NAND memories 119*a-h*, or that is en-route for storage at one of the NAND memories 119*a-h*. In an implementation, AI engine includes one or more of vector processors, DSPs and other suitable cores for analysis of media data and generation of metadata. Detailed implementations of metadata generation by the AI engine 131 are further described in relation to FIGS. 3-6. Alternatively, some or all functionality offered by a dedicated AI engine may be provided by one or more of the CPUs 132 and 133 running suitable software or firmware.

The AI engine 131 optionally includes its own CPU 132, which is separate from the CPU 133 of the storage controller 130. When the AI engine 131 includes the CPU 132, the CPU 132 is suitably configured as a co-processor configured, for instance, to offload various AI related compute operations from main CPU 133, manage AI engine interrupts and register programming, assist metadata generation, etc. When the AI engine 131 does not include CPU 132, any CPU-operation needed by AI engine 131 such as any computational task to generate metadata is performed by the CPU 133 of the storage controller 130. In such cases, the AI engine 131 shares the CPU resource with other storage related operations. Detailed implementation of metadata generation by a dedicated CPU at the AI engine are described in relation to FIGS. 7-8.

The storage device 120 includes a local volatile memory, such as DRAM 125, configured to store data parameters for the AI models, such as coefficients, weights of a deep neural network. In this way, the AI engine 131 is configured to obtain data parameters from the DRAM 125 via the DRAM controller 134 to suitable perform computations required by AI models.

Figure 2:
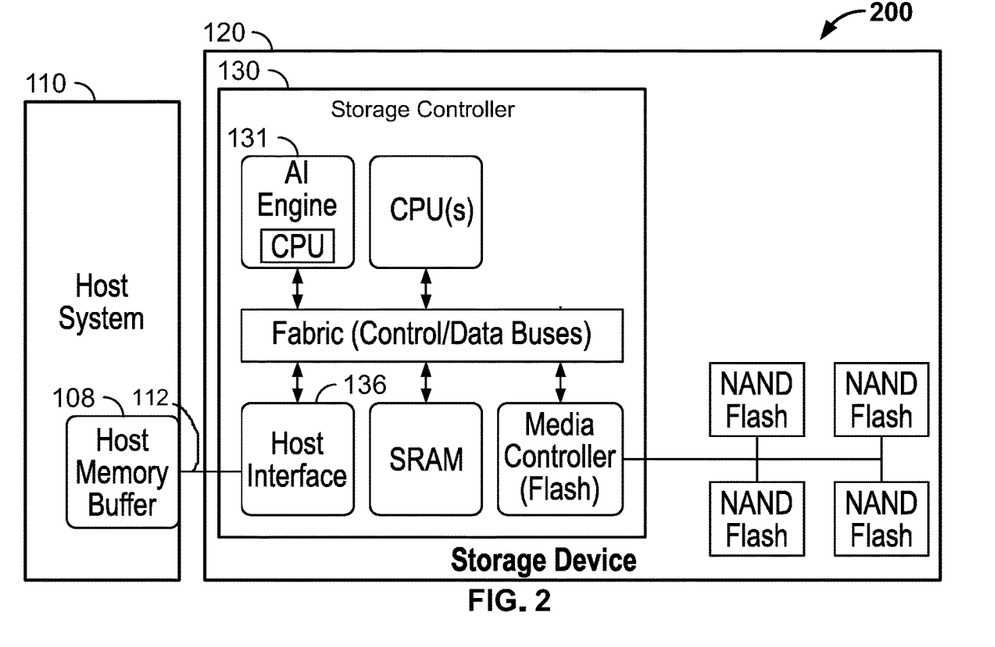
FIG. 2 is a block diagram illustrating an alternative in-storage compute structure without an in-storage DRAM for the solid-state device (SSD) storage device, according to one alternative embodiment described herein.

FIG. 2 is a block diagram illustrating an alternative in-storage compute structure without an in-storage DRAM for the storage device, according to one alternative embodiment described herein. Diagram 200 illustrates a storage device 120 and a host system 110 similar to those in diagram 100 in FIG. 1. Unlike the structure shown in diagram 100, the storage device 120 does not have, and thus does not store data parameters of AI models at a local DRAM. Instead, the host system 110 is configured to allocate a piece of memory as a host buffer memory 108, to the storage controller 130 for storing data parameters for the AI models. The host memory buffer 108 is located at the host 110 and is accessible by the storage controller 130 via the host interface 136, for example, over a data bus connection 112, or in one or more of the NAND flash memories 119a-d. Thus, data parameters for the AI models 108 are passed from the host memory buffer 108, or from a NAND flash, to the AI engine 131 via the host interface 136 for example, over the data bus connection 112.

In some embodiments, the in-storage compute structure can be applied when the host system 110 is local to storage device 120 and is connected to the storage device 120 via a data bus 112. As the host system 110 is not remote from the storage device 120, data exchange between the host system 110 and the storage device 120 is relatively more efficient than that of the scenario when the host system is remotely connected to the storage device via a network connection. Thus parameters of the AI models stored at the host side (e.g., the host memory buffer 108) can be read and sent to the storage side efficiently. When the data parameters of the AI models include a large amount of data, the host memory buffer 108 can serve as a local memory to store the large amount of data without being limited to the data capacity of a SRAM or a DRAM located within the storage device 120.

Figure 3:
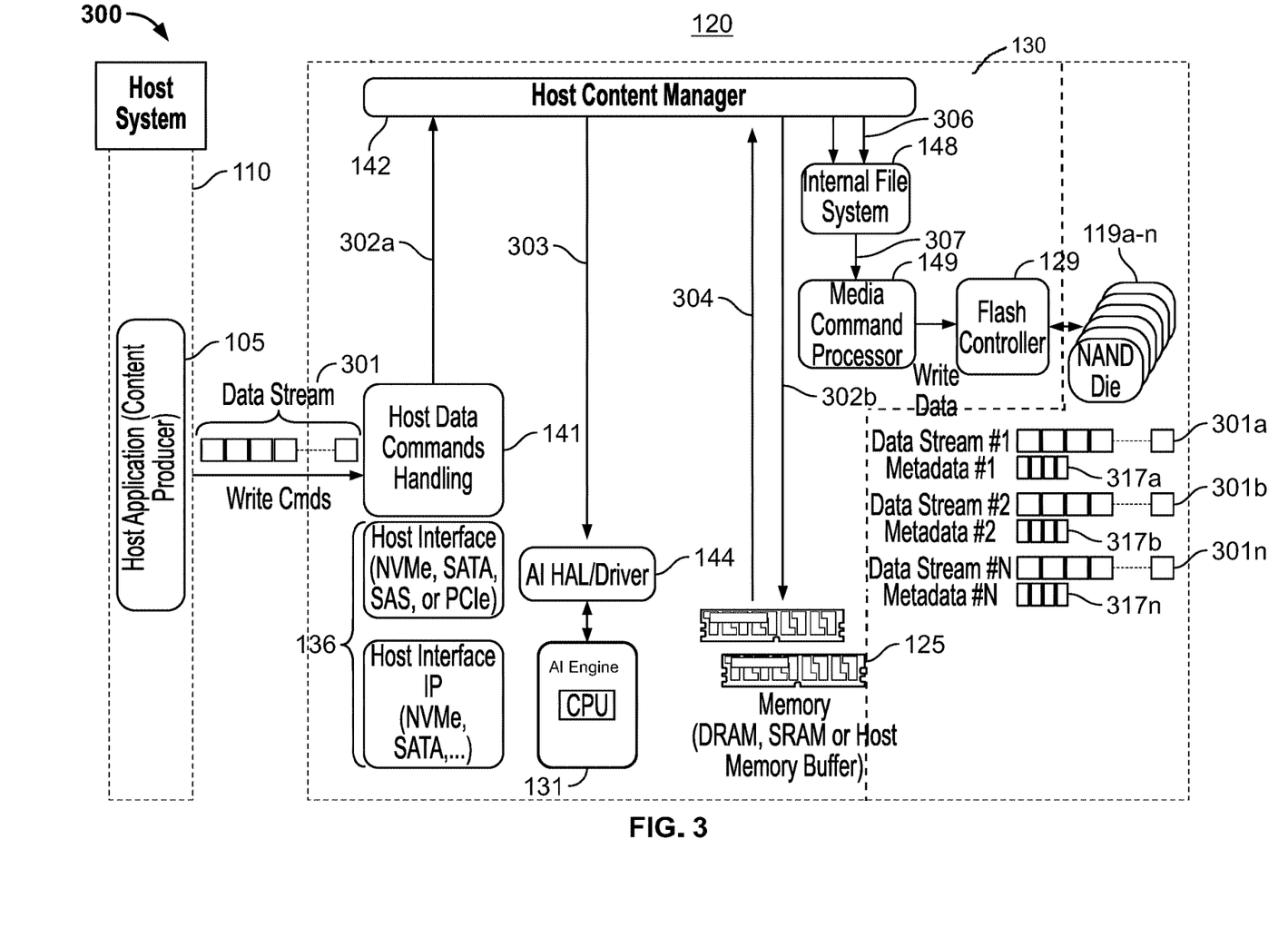
FIG. 3 is a schematic data flow diagram illustrating various modules within a non-volatile memory storage device, and data flows between those modules, for metadata generation of data streams transmitted from the host system.
Figure 4:
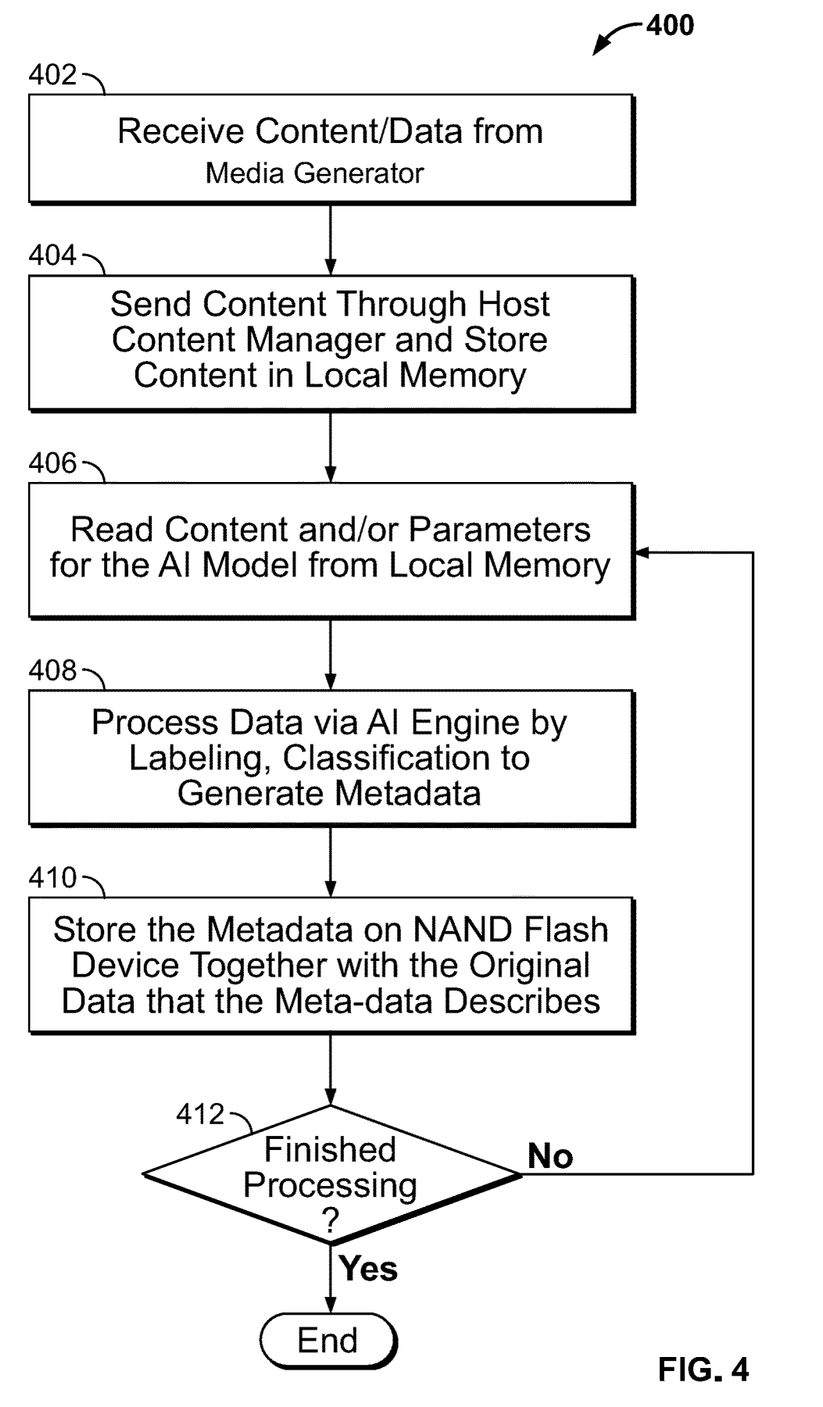
FIG. 4 is a logic flow diagram providing an example logic flow of data flows depicted in FIG. 3, according to an embodiment described herein.

FIG. 3 is a schematic data flow diagram illustrating various modules within a non-volatile memory storage device, and data flows between those modules, for metadata generation of data streams transmitted from the host system, and FIG. 4 is a logic flow diagram providing an example logic flow of data flows depicted in FIG. 3, according to an embodiment described herein. Diagram 300 illustrates the storage controller 130 communicatively coupled to the host system 110 and a flow of data through between various components. The components of storage controller 130 and host system 110 are similar to structures described in diagrams 100-200 shown in FIGS. 1-2. Process 400 is implemented, in the illustrated example, using the structures seen in diagram 300 through data exchange between the various modules of the storage device 120 and the host system 110.

Specifically, process 400 starts at 402, where unstructured data such as media objects is received directly or indirectly from a media generator. For example, in some implementations, media objects are received from a host application 105 running at the host system 100. In some other implementations, unstructured media objects is received directly or indirectly from a device that generates the media objects, without passing through a host processor, or after passing through a server (i.e. a cloud server) that is different from the host processor where at metadata might be generated or analyzed. A write command is sent, together with a data stream 301 of media objects to the storage device 120 for storage. Specifically, the data stream 301 sent to the storage device 120 contains unstructured (i.e., raw) media objects or partially structured objects (e.g., framed or with partial metadata that only partially describes some attributes of the media content).

At 404, the data stream 301 of media objects, which is unstructured or partially structured, is sent through a host content manager 142 and temporarily stored at the local memory 125. The host content manager 142 is a software module implemented by the CPU 133 to operate with the host interface 136 of the storage controller 130. For example, the host interface 136 is configured to receive the data stream 301 of unstructured media objects from the host system 110. A host data commands handling module 141 is then configured to forward the unstructured media objects to the host content manager 142 at 302a. For example, the host data commands handling module 141 and the host content manager 142 are software modules running on the same CPU 133 and are configured to exchange data. The host content manager 142 is configured to forward the data content to the local memory 125 via data bus 302b. In an implementation, the local memory 125 is a DRAM as shown in FIG. 1. In another implementation, instead of sending data stream 301 for temporary storage at the local memory 125 within the SSD storage device 130, the data stream 301 is temporarily stored at a NAND based caching system (not shown) formed in one of the NAND memories. Further examples of NAND based caching systems can be found in commonly-owned U.S. Pat. No. 9,477,611, issued on Oct. 25, 2016; and U.S. Pat. No. 10,067,687, issued on Sep. 4, 2018.

At 406, unstructured media objects and/or the parameters of AI models (e.g. weights/coefficients of a deep neural network) are read from local memory 125. For example, the parameters of AI models were previously obtained from the host system 110 and pre-stored at the local memory 125. In some implementations, the parameters of AI models are periodically, constantly or intermittently updated with new parameters from the host system 110, via the data buses 302a-b. The host content manager module 142, is configured to read the unstructured media objects and parameters for the AI models from local memory 125 via data bus 304. In another implementation, the parameters for the AI models are optionally read from the host memory buffer 108 shown in FIG. 2.

At 408, unstructured or partially structured media objects are processed by the AI engine 131 by classification, labeling, or documentation, etc. of various types of media objects such as videos, sound recordings, still images, textual objects such as text messages and e-mails, data obtained from various types of sensors such as automotive sensors and Internet-of-Things (IoT) sensors, database objects, and/or any other suitable objects. Specifically, the host content manager is configured to send the data content and the data parameters for the AI models to an AI driver 144 (e.g., a HAL driver) running with the AI engine 131. The AI driver 144 is then configured to incorporate the data parameters to implement the desired AI model (with desired coefficients/ weights for a deep neural network). The AI engine 131 is then configured to produce metadata that describes the data content by running the AI models. The generated metadata can then be sent to the media controller 138 via the fabric of data bus 135 shown in FIGS. 1-2.

At 410, the generated metadata is stored together with the original data content on NAND flash memories 119*a-n*, in an implementation. Specifically, the host content manager 142 is configured to cause the generated metadata from the AI engine 131 to transmit to an internal file system 148 via data bus 306, which is part of the fabric of data bus 135. The internal file system 148 is then configured to link the metadata with the corresponding media objects. Further examples of the internal file system 148 linking the metadata with the corresponding media objects can be found in co-pending and commonly-owned U.S. Application No. 16/262,971, filed on Jan. 31, 2019. The metadata is then sent from the internal file system 148 to media command processor 149 via data bus 307, which is part of the fabric of data bus 135. The media command processor 149 in turn issues a write command to write the metadata to the NAND flash memories 119*a-n* via the flash controller 129.

In some implementations, the generated metadata is stored together with the original data content in the NAND flash memories 119*a-n*. For example, each data streams 301*a-n* is accompanied by the corresponding metadata 317*a-n* that describes the respective data stream. In this way, the metadata 317*a-n* can be separately retrieved from the original data content 301*a-n*, either by storage at separate physical locations or by logical separation.

In some implementations, the metadata can be stored separately from the data content, e.g., not in continuous memory addresses, not within the same memory page, or not even on the same NAND memory die. In this case, the internal file system 148 is configured to assign a pointer that links the memory address where media objects of data content reside and the memory address where the metadata that describes the data content resides. In this way, when a portion of the original data content in the media objects of interest is identified using the metadata, the corresponding segments of the media can be retrieved from the unstructured media objects. Further details of the storage structure of the unstructured media objects and the metadata that describes the media objects can be found in co-pending and commonly-owned U.S. Application No. 16/263,387, filed on Jan. 31, 2019.

At 412, when the data processing is not finished, e.g., when there is new data stream of media objects to be processed, a separate set of metadata corresponding to a different set of content attributes using a different AI model is to be generated, etc., process 400 proceeds to repeat 406, 408 and 410. When the data processing is finished, process 400 ends.

Figure 5:
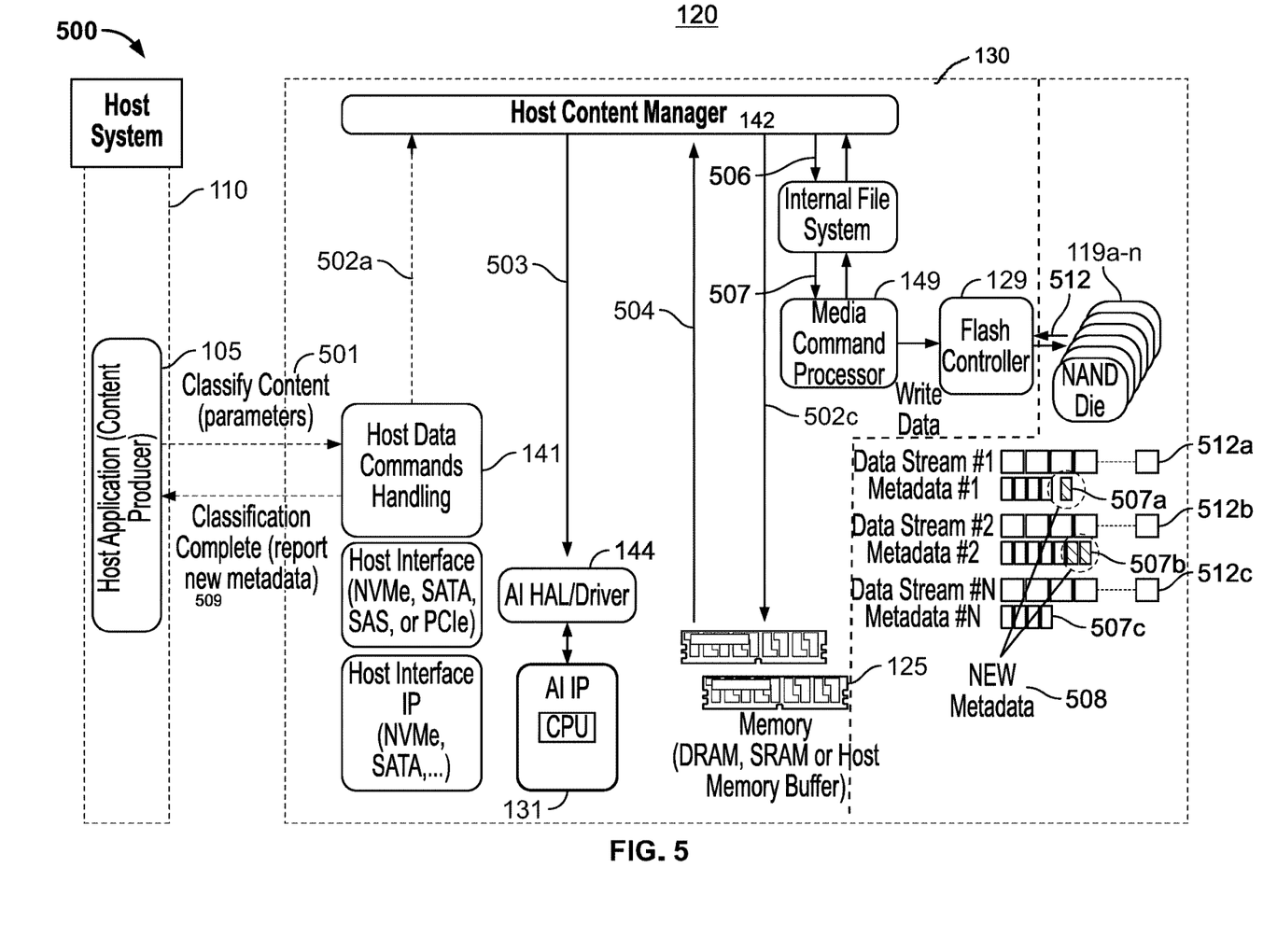
FIG. 5 is a schematic data flow diagram illustrating various modules within a non-volatile memory storage device, and data flows between those modules, for metadata generation of data stored in non-volatile memories according to another embodiment described herein.
Figure 6:
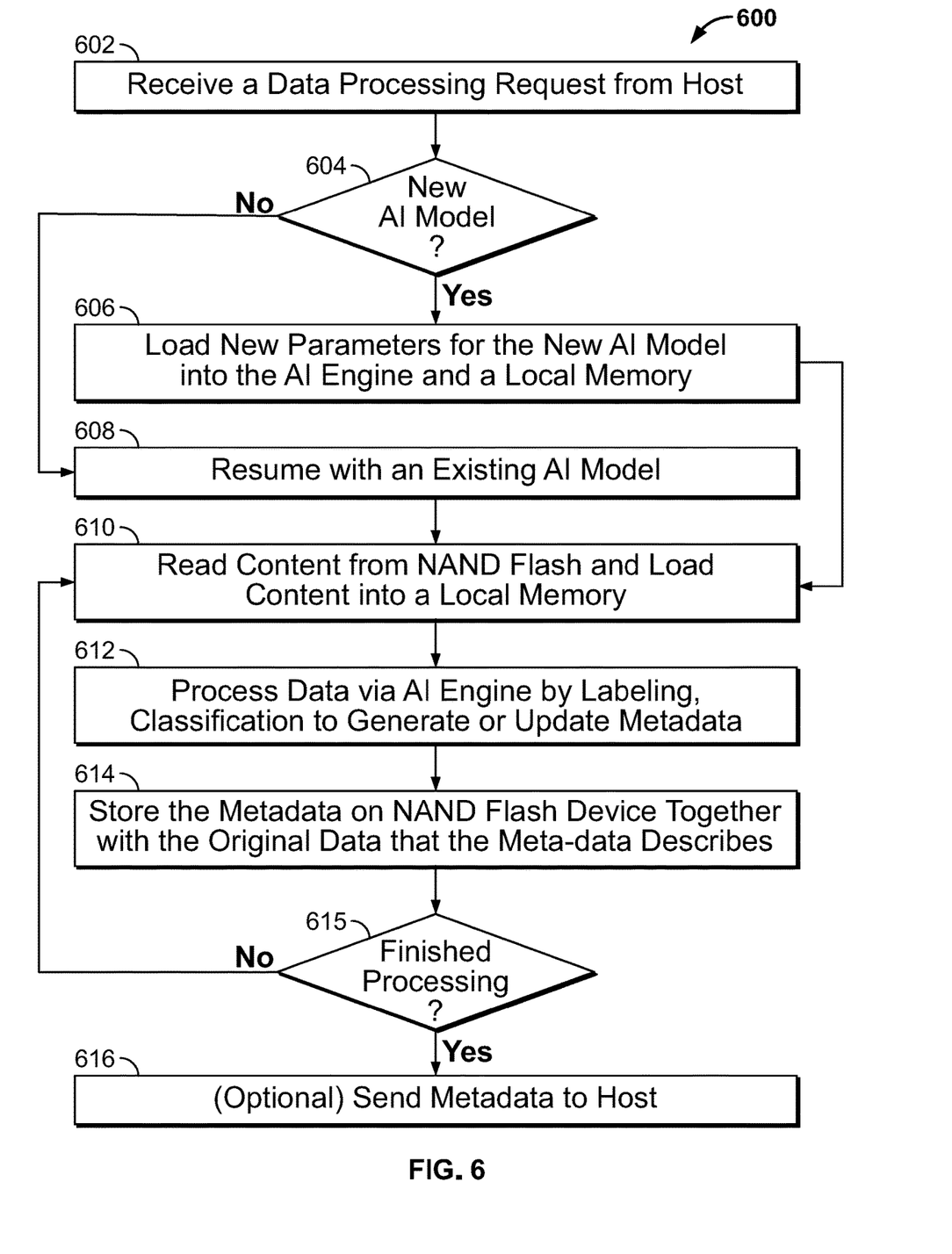
FIG. 6 is a logic flow diagram providing an example logic flow of data flows depicted in FIG. 5, according to another embodiment described herein.

FIG. 5 is a schematic data flow diagram illustrating various modules within a non-volatile memory storage device, and data flows between those modules, for metadata generation of data stored in non-volatile memories, and FIG. 6 is a logic flow diagram providing an example logic flow of data flows depicted in FIG. 5, according to another embodiment described herein. Diagram 500 shows the SSD storage device 120 communicatively coupled to the host system 110, similar to the structure described in diagram 100-200 shown in FIGS. 1-2, and similar to the structure shown at diagram 300 in FIG. 3. Process 600 is implemented upon the structure shown by diagram 500 through data exchange between the various modules of the SSD storage device 120 and the host system 110.

Specifically, unlike process 400 which receives and processes data streams from the host system 110, process 600 and the data flow in diagram 500 describes the scenario in which unstructured or partially media objects is already stored on the NAND flash memories 119*a-n* but the corresponding metadata has not yet been fully generated. Process 600 can thus be applied to an "off-line" scenario in which unstructured or partially structured media objects is processed (or re-processed) at a later time than the time when the unstructured or partially structured media objects was originally received from the host system.

At 602, a data request is received from the host system 110 to process unstructured media objects that previously had been stored at the non-volatile memories, e.g., NAND flash memories 119*a-n*. Specifically, the host application 105 is configured to issue a command 501 to instruct the storage controller 130 to retrieve a portion of unstructured or partially structured media objects of data content from the non-volatile memories 119*a-n*. Specifically, upon receiving the command 501, the host data command handling module 141 is configured to forward the command to the host content manager 142 via data bus 502*a*, which will in turn cause the retrieval of media objects from the NAND memories 119*a-d* to local memory 125.

At 604, the host content manager 142 is configured to determine whether the command 501 requests data processing with an existing AI model that is already loaded into the AI engine 131, or requests to re-process the stored data content using a new AI model that is not yet loaded into the AI engine 131.

When the command 501 requests data processing with the existing AI model, process 600 proceeds with 608, at which the AI engine 131 is configured to resume with the existing AI model that is already loaded at the AI engine 131 for metadata generation.

When the command 501 requests data processing with a new AI model, process 600 proceeds with 606, at which new data parameters for the AI model is loaded into the AI engine 131 and the local memory 125. Specifically, new data parameters (e.g. new parameters/weights, new Neural Network models, etc.) are sometimes sent together with the command 501 from the host system 110 to the host data commands handling module 141, which in turn sends the new data parameters to the host content manager 142 via data bus 502*a*. The host content manager 142 is then configured to send the new data parameters to the local memory 125 for storage (e.g., to update the previously stored parameters for the AI model, etc.) via data bus 502*c*, which is part of the fabric of data bus 135. The host content manager 142 also sends the new data parameters to AI driver 144 via data bus 503, which is part of the fabric of data bus 135. The AI driver 144 is then configured to incorporate the new data parameters to implement a new AI model at the AI engine 131.

In some implementations, instead of being commanded by the host system 110, the storage controller 130 is configured to self-initiate calculation of metadata for unstructured media objects that are stored at the non-volatile memories 119*a-d*, when the storage controller 130 is idle from performing any storage and retrieval operation with data stored on the non-volatile memories, or from processing any data stream (e.g., 301 in FIG. 3) received directly from the host system 110, etc.. Thus, when the storage controller 130 is idle from performing storage operations, such as reading from or writing data to the non-volatile memories, CPU resource of the storage controller 130 is used for extensive AI computations to generate metadata on content that is stored in one or more of non-volatile memories associated with the storage controller 130. In some implementations, storage controller 130 is an aggregator that is configured to operate with and control multiple storage devices such as a memory array. Further details of using an aggregator to calculate and aggregate metadata for unstructured media objects stored at a memory array can be found in co-pending and commonly-owned U.S. Application No. 16/264,248, filed on Jan. 31, 2019.

Process 600 then proceeds to 610 after operations 606 or 608. Operations 610-615 are similar to Operations 406-412 in FIG. 4, respectively, except that data content is re-processed with a new AI model, in an implementation. In this case, some metadata may have been produced earlier for the same data content and is updated, or embellished, with the newly generated metadata from the new AI model.

At 610, media objects of data content are retrieved from the NAND flash memories 119a-n to local memory 125. Specifically, the flash controller 129 receives the media objects of data content retrieved from the NAND memories 119a-n via data bus 512 and provides the data content to the host content manager 142, which is configured to supply the data content to be processed or re-processed to local memory 125 via data bus 502c.

At 612, the unstructured media objects are processed by the AI engine 131, which either at 608 runs previously loaded AI model, or at 606 generates and runs a new AI model. Specifically, the host content manager 142 is configured to read the data content from local memory 125 via data bus 504, and then send, via data bus 503, the data content to an AI driver 144 running with the AI engine 131. The AI engine 131 is then configured to produce metadata that describes the data content by running the available (existing or new) AI model.

At 614, the generated metadata is provided to the NAND flash memories 119a-n for storage. Specifically, the host content manager 142 is configured to cause the generated metadata from the AI engine 131 to transmit to an internal file system 148 via data bus 506, which is part of the fabric of data bus 135. The internal file system 148 is then configured to link the metadata with the corresponding media objects. Further examples of the internal file system 148 linking the metadata with the corresponding media objects can be found in co-pending and commonly-owned U.S. Application No. 16/262,971, filed on Jan. 31, 2019.

The media command processor 149 in turn issues a write command to write the metadata to the NAND flash memories 119a-n via the flash controller 129.

At 614, the generated metadata is provided to the NAND flash memories 119a-n for storage. Specifically, the host content manager 142 is configured to cause the generated metadata from the AI engine 131 to transmit to an internal file system 148 via data bus 506, which is part of the fabric of data bus 135. The internal file system 148 is then configured to link the metadata with the corresponding media objects. Further examples of the internal file system 148 linking the metadata with the corresponding media objects can be found in co-pending and commonly-owned U.S. Application No. 16/262,971, filed on Jan. 31, 2019.

At 615, when the data processing is not finished, e.g., there is additional data to be processed, a separate set of metadata corresponding to a different set of content attributes using a different AI model is to be generated, etc., process 600 proceeds to repeat 610, 612 and 614. When the data processing is finished, process 600 proceeds to 616, at which the newly generated metadata is optionally sent back to the host system 110, e.g., via a form of a report containing the new metadata 509. In an implementation, the storage controller 130 is configured to send the report of new metadata 509 back to the host system 110 when the data processing is done. Or alternatively, the storage controller 130 is configured to send the report of new metadata 509 back to the host system 110 asynchronously with respect to the command 501. For example, at any point, the host system can request the metadata while the update of metadata is being performed, and the storage controller 130 is configured to send back the report of new metadata 509 when the metadata update is finished, asynchronous to the metadata request.

Figure 7:
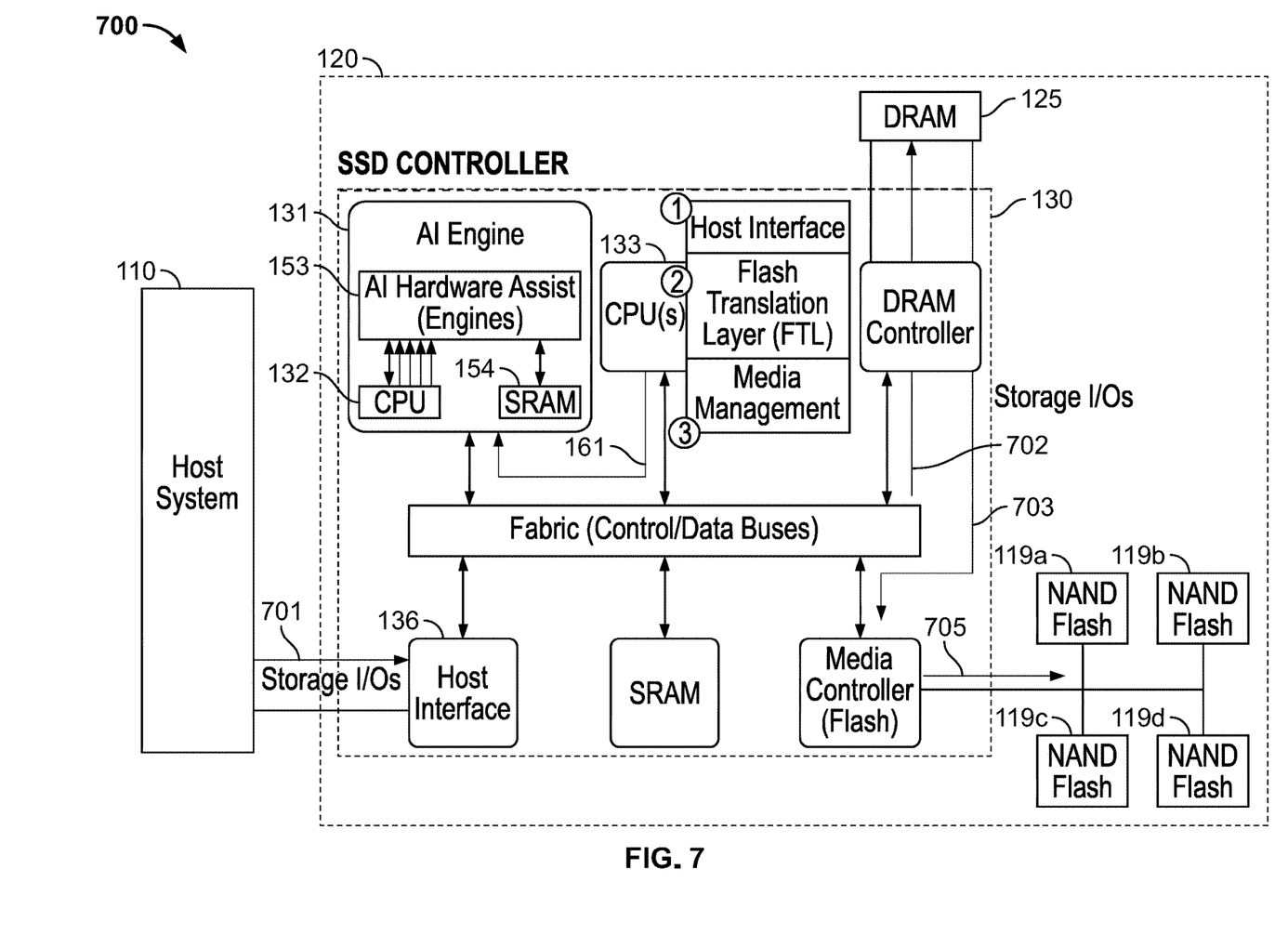
FIG. 7 is a schematic data flow diagram illustrating various modules within a non-volatile memory storage device, and data flows between those modules, for metadata generation with a dedicated CPU within an AI engine of a storage device.
Figure 8:
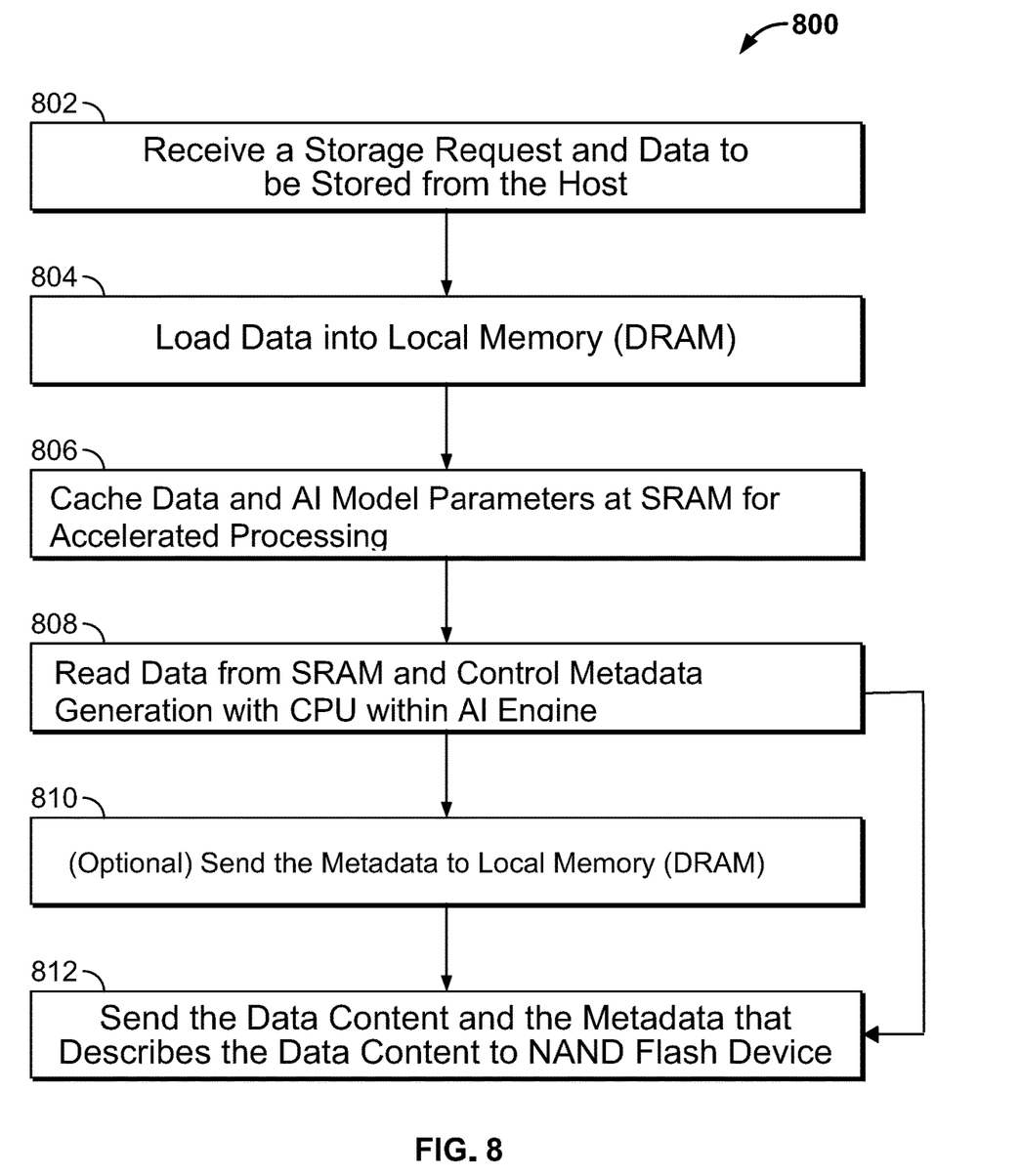
FIG. 8 is a logic flow diagram providing an example logic flow of data flows depicted in in FIG. 7, according to another embodiment described herein.

FIG. 7 is a schematic data flow diagram illustrating various modules within a non-volatile memory storage device, and data flows between those modules, for metadata generation with a dedicated CPU within an AI engine of a storage device, and FIG. 8 is a logic flow diagram providing an example logic flow of data flows depicted in in FIG. 7, according to another embodiment described herein. Diagram 700 shows the storage device 120 communicatively coupled to the host system 110, similar to the structure described in diagram 100-200 shown in FIGS. 1-2. Process 800 is implemented upon the structure shown by diagram 700 through data exchange between the various modules of the storage device 120 and the host system 110. Specifically, diagram 700 describes a storage controller structure 130 in which the AI engine 131 includes its own CPU 132 and a SRAM 154.

At the storage controller 130, the CPU 133 employed to program control register(s) at the CPU 133 to perform an AI-related operation, in an implementation. A service interrupt is sent from AI engine 131 to the CPU 133 when AI-related operations are complete such that the CPU 133 can release the programmed control registers to engage other activities. For example, CPU 133 often requires resources for host interface management to fetch commands and transfer data from the host system 110, perform Flash Translation Layer (FTL) operations to abstract the underlying media data from NAND flash memories 119a-d, perform media management to access the underlying media (e.g., NAND memory 119a-d, etc.) devices and perform actual data read or write operations, etc. With the recursive nature of some AI models, AI operations will need to be repeated at times at high frequency. Were the CPU 133 required to constantly assign control registers to perform AI operations, a relatively high CPU workload would be incurred. This would take up bandwidth of the storage controller CPU 133 and reduce its availability to perform storage related tasks, thereby negatively impacting storage performance.

CPU 132, or coprocessor is included in the AI engine 131 to offload AI-related tasks from the main CPU(s) 133, and to provide operating system (OS) isolation between AI management and main OS running storage-related tasks. CPUs 132 include one or more processor units providing powerful general purpose, digital signal, vector or other suitable central processing functionalities. In addition, a dedicated SRAM 154 is located within the AI engine 131 for caching frequently accessed data such that data does not need to be read out the DRAM 125 (or read out from a NAND based cache) over the fabric. Thus, the bandwidth of the fabric can be applied to other non-AI-related operations.

Process 800 starts at 802, where a storage request 701 and data content to be stored is received from the host system 110, e.g., similar to Operation 402 in FIG. 4. At 804, the data content is loaded into the local memory DRAM 125 via data bus 702, e.g., similar to Operation 404 in FIG. 4. At 806, frequently access data is cached into the dedicated SRAM 154 inside the AI engine 131. For example, in an implementation, the data caching is performed progressively alongside the implementation of the AI engine while the metadata is being generated. Segments of the unstructured media objects of data content to be processed, frequently used data variables in a recursive AI model, etc., are respectively cached at the SRAM 154 for access and use in the subsequent iterations of the AI models. In one implementation, data cached at the SRAM 154 is constantly, periodically, or intermittently overwritten and replaced as needed while the AI model is being implemented.

At 808, the AI engine 131 is configured to read cached data from the SRAM 154 and continue with the AI model implementation. Specifically, the AI hardware 153 is configured to assist the AI-related tasks, but typically these AI operations are not fully hardware automated and still require some CPU assistance for more complex tasks. The CPU 133 of the storage controller 133 is configured to assign all or substantially all AI related tasks 161 to the dedicated CPU 132, which is local to storage controller 130, for processing.

At 810, the generated metadata is optionally stored at the local memory DRAM 125, or directly to NAND flash at 812, for instance in a NAND based cache. For example, the newly generated metadata is stored with the parameters for the AI model at DRAM 125, which can be used as updated training data to revise the AI model. At 812, the data content and the metadata that describes the data content is sent to the NAND flash memories 119a-d for storage, via data bus 703 and 705.

In some implementations, the AI operations at 808 are performed concurrently with the storage operations at 802, 804, 810 and 812. For example, new data can be continuously sent from the host system 110 to the storage controller 130 while the metadata is being generated at the AI engine 131. With the dedicated CPU 132, the CPU 133 is configured to manage the storage operations (e.g., 802, 804, 810 and 812), while offloading AI operations 161 to the dedicated CPU 132, e.g., programming AI block registers at the AI engine 131, servicing AI interrupts, etc. The AI-related tasks thus will not disturb operation of the storage controller CPU 133 when performing SSD-related tasks, and do not effectively increase the workload of CPU 133.

Various embodiments discussed in conjunction with FIGS. 1-8 are implemented by electronic components of one or more electronic circuits, such as but not limited to an integrated circuit, application-specific integrated circuit (ASIC), and/or the like. Various components discussed throughout this disclosure such as, but not limited to the CPU 133, AI engine 131, host interface 136, and/or the like, are configured to include a set of electronic circuit components, and communicatively operate on one or more electronic circuits.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein can be employed in practicing the disclosure. It is intended that the following claims define the scope of the disclosure and that methods and structures within the scope of these claims and their equivalents be covered thereby.

The subject matter of this specification has been described in terms of particular aspects, but other aspects can be implemented and are within the scope of the following claims. For example, the actions recited in the claims can be performed in a different order and still achieve desirable results. In certain implementations, multitasking and parallel processing can be advantageous. Other variations are within the scope of the following claims.

What is claimed is:

1. A storage device controller for managing storage and retrieval of data at one or more storage devices, the storage device controller comprising:
    a host interface configured to communicate with one or more hosts;
    a memory interface, configured to communicate locally with a non-volatile memory of the one or more storage devices;
    a first processor for managing local storage or retrieval of data objects at the non-volatile memory, the first processor being configured to:
        determine whether the first processor is in a low utilization state for controlling storage operations; and
        based on the determination, selectively store in the non-volatile memory received data objects that are received from the one or more hosts, or retrieve from the non-volatile memory stored data objects that are stored in the non-volatile memory to be provided to a computational engine, including retrieving stored data objects from the non-volatile memory in response to determining that the first processor is in the low utilization state;
    wherein the computational engine is configured to:
        obtain, from a volatile memory, a first computational model and a set of parameters for implementing the first computational model for computing metadata that defines content characteristics of the data objects, and
        using the first computational model, compute the metadata of the stored data objects that are selectively retrieved from the non-volatile memory or compute the metadata of selected received data objects that are received from the one or more hosts for storage in the non-volatile memory before the received data objects are stored by the first processor in the non-volatile memory.

2. The storage device controller of claim 1, wherein the volatile memory is a dynamic random-access memory coupled to the storage device controller.

3. The storage device controller of claim 1, wherein the volatile memory is a host memory buffer allocated by a host system to the storage device controller, and wherein the host memory buffer is accessible by the storage device controller over a computer network connection, or a bus connection.

4. The storage device controller of claim 1, wherein the computational engine comprises:
    a second processor that is separate from the first processor and is configured to perform computational tasks relating to metadata generation including implementing the first computational model, and
    wherein the first processor is configured to:
        send a computational task relating to metadata generation to the second processor at the computational engine without taking up resource of the first processor for an ongoing operation being performed by the storage device controller.

5. The storage device controller of claim 4, wherein the computational engine further comprises:
    a volatile memory coupled to the second processor, wherein the volatile memory is a static random-access memory configured to cache at least a portion of the data objects during computation of the metadata that defines content characteristics of the cached portion of data objects.

6. The storage device controller of claim 1, wherein the first processor is further configured to:
receive, via the host interface, the data objects from the one or more hosts, wherein the data objects are to be stored at the non-volatile memory;
temporarily store the received data objects at a volatile memory disposed within the storage device controller for metadata computation;
after computation of the metadata that defines content characteristics of the data objects is completed:
send, via the memory interface, the received data objects from the volatile memory to the non-volatile memory for storage; and
perform at least one of: sending, via the host interface, the metadata to the host system, and sending, via the memory interface, the metadata to the non-volatile memory for storage.

7. The storage device controller of claim 1, wherein the first processor is further configured to:
receive, via the host interface, a command from a host system of the one or more hosts to retrieve the data objects from the non-volatile memory;
in response to the command, retrieve, via the memory interface, the data objects from the volatile memory disposed within the storage controller for metadata computation; and
after computation of metadata defining content characteristics of the data objects is completed, send, via the memory interface, the metadata and the data objects to the non-volatile memory for storage.

8. The storage device controller of claim 1, wherein the first processor is further configured to:
receive, via the host interface and from the one or more hosts, a request for metadata while the computational engine is computing the metadata; and
respond to the request for metadata asynchronously by:
waiting until the requested metadata is computed at the computational engine; and
sending, via the host interface, the requested metadata to the host system while new metadata, different from the requested metadata, is being computed at the computational engine.

9. The storage device controller of claim 7, wherein the first processor is further configured to:
in response to the command, determine whether the command from the host system requires an update of the first computational model;
in response to determining that the command from the host system does not require an update of the computational model, instruct the computational engine to implement an existing computational model;
in response to determining that the command from the host system requires the first computational model to be updated to a second computational model different from the first computational model:
retrieve a set of updated parameters for the second computational model from the volatile memory disposed within the storage controller, or, via the host interface, from a host buffer memory disposed within the host system, and
send the set of updated parameters to the computational engine to implement the second computational model.

10. The storage device controller of claim 1, wherein the computational engine is further configured to automatically generate metadata that defines content characteristics of the objects by performing any of identification of persons of interest or other objects; customized insertion of advertisements into streamed videos; cloud-based analytics of data from autonomous vehicles; analytics of call and response quality in a ChatBot Voice calls database, text documents and text messages database analysis; mood detection; scene identification within a video file or voice call; identification of persons or objects in surveillance footage; identification of types of actions occurring in surveillance footage; identification of voices or types of sounds in recordings; classification of phrases and responses used during conversations; and analysis of automotive sensor data and driving response.

11. A method for managing storage and retrieval of data at one or more storage devices, the method comprising:
communicating, via a host interface of a storage device controller, with one or more hosts;
communicating, via a memory interface of the storage device controller, locally with a non-volatile memory of the one or more storage devices;
determine whether a first processor of the storage device controller is in a low utilization state for controlling storage operations;
managing, via the first processor of the storage device controller, local storage or retrieval of data objects at the non-volatile memory, wherein the first processor is configured to, based on the determination, selectively store in the non-volatile memory received data objects that are received from the one or more hosts, or retrieve from the non-volatile memory stored data objects that are stored in the non-volatile memory to be provided to a computational engine, including retrieving stored data objects from the non-volatile memory in response to determining that the first processor is in the low utilization state;
obtaining, from a volatile memory, a first computational model and a set of parameters to implement the first computational model to compute the metadata that defines content characteristics of the data objects; and
computing, via the computational engine using the computational model, the metadata of the stored data objects that are selectively retrieved from the non-volatile memory or the metadata of selected received data objects that are received from the one or more hosts for storage in the non-volatile memory before the received data objects are stored by the first processor in the non-volatile memory.

12. The method of claim 11, further comprising:
storing parameters of the first computational model for the computational engine at the volatile memory,
wherein the volatile memory is a dynamic random-access memory coupled to the storage device controller.

13. The method of claim 11, further comprising:
storing parameters of the computational model for the computational engine at the volatile memory, wherein the volatile memory is a host memory buffer allocated by a host system to the storage device controller, and wherein the host memory buffer is accessible by the storage device controller over a computer network connection, or a bus connection.

14. The method of claim 11, further comprising:
implementing the computational model by a second processor that is separate from the first processor; and sending, by the first processor, a computational task relating to metadata generation to the second processor at the computational engine without taking up resource of the first processor for an ongoing operation being performed by the storage device controller.

15. The method of claim 14, further comprising:
caching, at least a portion of the data objects during computation of the metadata that defines content characteristics of the cached portion of data objects, at a volatile memory coupled to the second processor, wherein the volatile memory is a static random-access memory.

16. The method of claim 11, further comprising:
receiving, via the host interface, the data objects from the one or more hosts, wherein the objects are to be stored at the non-volatile memory;
temporarily storing the received data objects at a volatile memory disposed within the storage device controller for metadata computation;
after computation of the metadata that defines content characteristics of the data objects is completed:
sending, via the memory interface, the received data objects from the volatile memory to the non-volatile memory for storage; and
performing at least one of: sending, via the host interface, the metadata to the host system, and sending, via the memory interface, the metadata to the non-volatile memory for storage.

17. The method of claim 11, further comprising:
receiving, via the host interface, a command from a host system of the one or more hosts to retrieve the objects from the non-volatile memory;
in response to the command, retrieving, via the memory interface, the data objects from the volatile memory to a volatile memory disposed within the storage controller for metadata computation; and
after computation of the metadata that defines content characteristics of the data objects is completed, sending, via the memory interface, the metadata and the data objects to the non-volatile memory for storage.

18. The method of claim 11, further comprising:
receiving, via the host interface and from the one or more hosts, a request for metadata while the computational engine is computing the metadata; and
responding to the request for metadata asynchronously by:
waiting until the requested metadata is computed at the computational engine; and
sending, via the host interface, the requested metadata to the host system while new metadata different from the requested metadata is being computed at the computational engine.

19. The method of claim 17, further comprising:
in response to the command, determining whether the command requires an update of the first computational model;
in response to determining that the command from the host system requires no update of the first computational model, instructing the computational engine to implement the first computational model;
in response to determining that the command from the host system requires the first computational model to be updated to a second computational model different from the first computational model:
retrieving a set of updated parameters for the second computational model from the volatile memory disposed within the storage controller, or via the host interface and from a host buffer memory disposed within the host system, and
sending the set of updated parameters to the computational engine to implement the second computational model.

20. The method of claim 11, further comprising:
generating metadata that defines content characteristics of the objects by automatically performing any of identification of persons of interest or other objects; customized insertion of advertisements into streamed videos; cloud-based analytics of data from autonomous vehicles; analytics of call and response quality in a ChatBot Voice calls database, text documents and text messages database analysis; mood detection; scene identification within a video file or voice call; identification of persons or objects in surveillance footage; identification of types of actions occurring in surveillance footage; identification of voices or types of sounds in recordings; classification of phrases and responses used during conversations; and analysis of automotive sensor data and driving response.

* * * * *